of Patent: *Apr. 4, 2000

United States Patent [19]
Sowles et al.

[11] Patent Number: 6,047,161
[45] Date of Patent: *Apr. 4, 2000

[54] SATELLITE COMMUNICATION SYSTEM AND METHOD THEREOF

[75] Inventors: Kenneth Lee Sowles, Chandler; Peter Joseph Armbruster, Tempe; Daniel Richard Tayloe, Phoenix; Raymond Joseph Leopold, Tempe, all of Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/753,751

[22] Filed: Nov. 29, 1996

[51] Int. Cl.[7] .................................................. H04B 7/185
[52] U.S. Cl. .......................... 455/12.1; 455/13.1; 455/427
[58] Field of Search ................... 455/12.1, 13.1, 455/13.3, 13.2, 428, 427

[56] References Cited

U.S. PATENT DOCUMENTS

| | | | |
|---|---|---|---|
| 4,375,697 | 3/1983 | Visher | 455/13.1 |
| 5,119,225 | 6/1992 | Grant et al. | 455/12.1 |
| 5,408,237 | 4/1995 | Patterson et al. | 455/13.3 |
| 5,444,450 | 8/1995 | Olds et al. | 455/12.1 |
| 5,455,823 | 10/1995 | Noreen et al. | 455/12.1 |
| 5,506,886 | 4/1996 | Maine et al. | 455/12.1 |
| 5,509,004 | 4/1996 | Bishop, Jr. et al. | 455/12.1 |
| 5,572,216 | 11/1996 | Weinberg | 455/12.1 |
| 5,592,175 | 1/1997 | Tayloe | 455/12.1 |
| 5,715,297 | 2/1998 | Wiedeman | 455/427 |
| 5,722,042 | 2/1998 | Kimura et al. | 455/13.1 |

*Primary Examiner*—Reinhard J. Eisenzopf
*Assistant Examiner*—Sam Bhattacharya
*Attorney, Agent, or Firm*—Harold C. McGurk; Dana B. LeMoine; James E. Klekotka

[57] ABSTRACT

A system facilitates global cellular communication by utilizing a gateway satellite (1000) which communicates with low-earth orbiting satellites (10, 20) via signalling links (1001, 1002). Switching is performed in each of the satellites (10, 20) and switching interconnections as well as voice path communications are switched via the gateway satellite (1000). With switching performed in a gateway satellite (1000), the use of a ground-based gateway network (74) is minimized and, in some cases, eliminated.

8 Claims, 5 Drawing Sheets

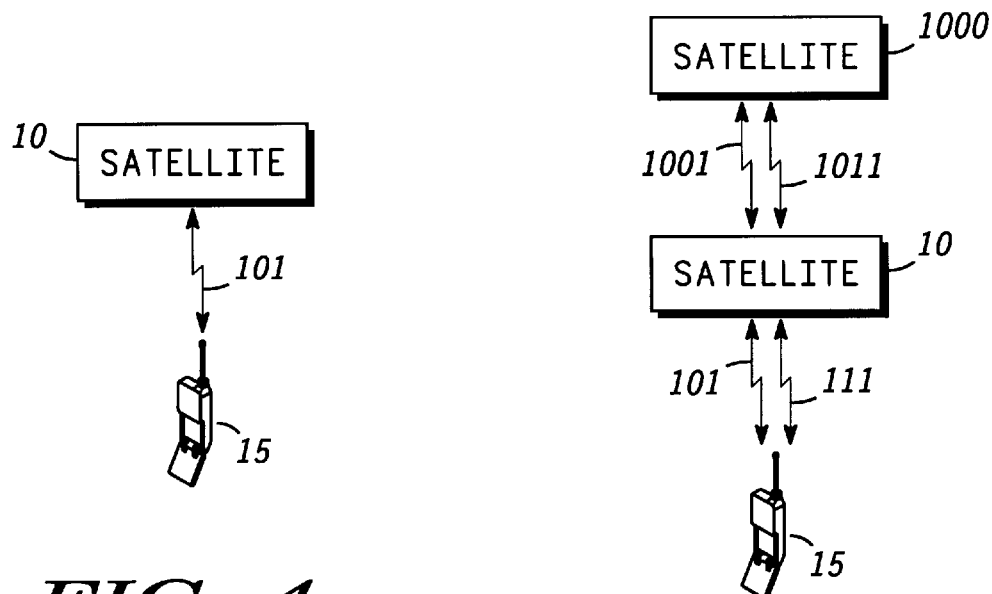
*FIG. 4*
*FIG. 6*
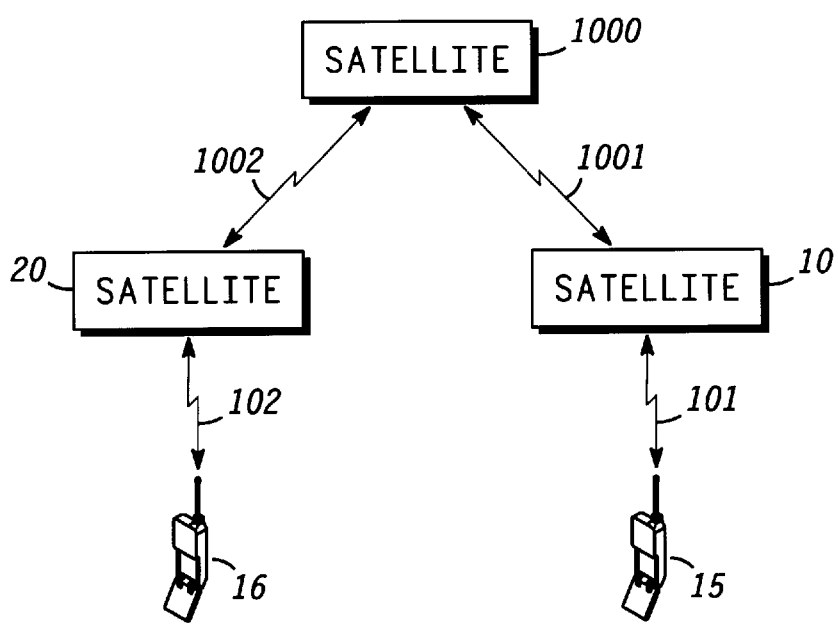
*FIG. 5*

SATELLITE COMMUNICATION SYSTEM AND METHOD THEREOF

FIELD OF THE INVENTION

This invention pertains to global mobile communications and, more particularly, to a satellite cellular telephone and data communication system.

BACKGROUND OF THE INVENTION

U.S. Pat. Nos. 5,410,728 and 5,509,004 both assigned to the assignee of the present invention describe a communication network that incorporates both space-based network switching centers and ground-based network switching centers to provide reasonable service quality with both basic and supplementary communication services. Satellite configurations for satellite cellular telephone communication systems are shown in those patents. In those configurations, a number of satellites in Low Earth Orbit ("LEO") are utilized. The satellites are in continuous movement about Earth. The satellite cellular structures are somewhat analogous to the present day cellular mobile telephone systems. In cellular mobile systems, cellular sites are fixed and users are mobile. As a user travels from one cell site to another, the telephone call is handed off from one cellular switching unit to another. In the satellite system of the '728 and '004 patents, users are relatively fixed at any given time while the satellites, which are the cells, are i n continuous movement. With a hand-held or mobile mounted cellular telephone, connection to one of the satellites is made directly from the hand-held mobile mounted or remotely fixed telephone to one of the nearest satellite switches. As a satellite which originally acted as a switching unit for a particular user leaves a cell of that switch, the user's call is "handed off" to the appropriate adjacent cell. Adjacent cells may be cells within one satellite or cells of other satellites located either in a particular orbiting plane or an adjacent orbiting plane. User's may "roam" but this roaming distance is relatively small compared to the traveling distance of the satellite switches.

Similar to the cellular mobile telephone system, the satellite cellular communication system provides spectral efficiency. This means that the same frequency may be simultaneously used by different satellite switches.

Spectral efficiency is provided by the spacial diversity between satellite switches and users. The users may be located anywhere on a land mass, on the water, or in the air at an altitude less than that of the LEO satellites. For example, a person at one location on earth could call a person at another location on earth, a person on a boat, or a person in an aircraft.

The previously described system provides a communication network which incorporates both space-based network switching centers and ground-based network switching centers to provide reasonable service quality for both basic and supplementary communication services. To establish telephone calls in a system of this type requires the use of ground-based switching networks. Various regulatory agencies may be involved in developing tariffs for service utilizing such a cellular system. In addition, the routing of telephone calls through the Public Switching Telephone Network ("PSTN") results in so-called "tail fees" for each call.

BRIEF DESCRIPTION OF THE DRAWING

FIG. 4 shows a first intermediate operational state of the communication network according to a preferred embodiment of the invention;

FIG. 5 shows a second intermediate state of the communication network according to a preferred embodiment of the invention;

FIG. 6 shows a third intermediate operational state of the communication network according to a preferred embodiment of the invention;

DETAILED DESCRIPTION OF THE PREFERRED EMBODIMENT

Figure 1:
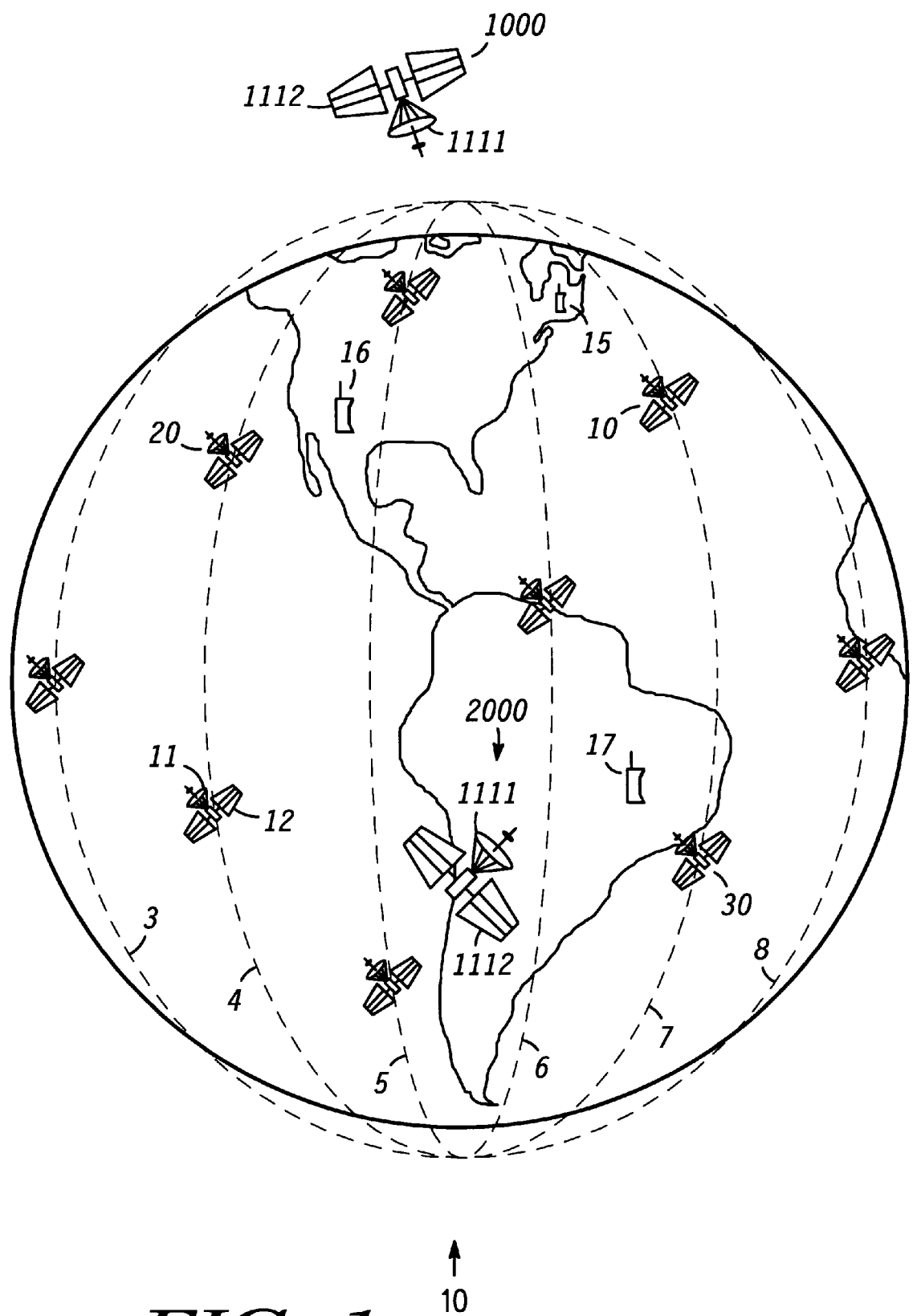
FIG. 1 depicts a satellite switching system configuration according to a preferred embodiment of the invention.

Referring to FIG. 1, a satellite configuration for the satellite cellular telephone communication system is shown. In this configuration, a number of satellites, such as satellites 10, 20, and 30 are shown in Low Earth Orbit ("LEO"). A number of satellites are placed in each orbiting plane. Satellites in orbiting planes 3 through 8 provide switching coverage for the entire earth. Each satellite contains a satellite switching unit (not shown), suitable antennas 11 and an unfolding array of solar cells 12 along with storage batteries (not shown) connected to the solar cells to provide power for the switching unit. The satellite busses or vehicles themselves are LEO satellites such as those commercially available. The satellites are put into orbit by a launching vehicle. When in orbit, the solar cell array is opened and the switching unit thereby activated. The satellites are then individually brought online via standard telemetry tracking and control channels to form the network.

In accordance with the preferred embodiment of the invention, at least one additional satellite 1000 is added. The additional satellite 1000 is, in a preferred embodiment, positioned in a high earth orbit (HEO), preferably a geosynchronous orbit. In this geosynchronous orbit, it will be able to have a line-of-sight communication to each of the satellites within at least one hemisphere visibility of the earth's surface. The additional satellite 1000 includes a telecommunications switching network which operates as a gateway switch. A gateway switch provides telephony functions and services, including but not limited to routing, user location tracking and subscriber profile management, for example. It includes antenna 1111 and solar panels 1112. By providing satellite 1000 with the capability to operate as a gateway, the routing of communication signals from one user 15 to a second user 16 can be performed without using a ground-based switching network (provided subscribers 15 and 16 utilize Subscriber Units ("SUs") to directly communicate via one or more associated LEO satellites.

More specifically, in the event that user 15 in FIG. 1 has an SU and goes off-hook, his request for service is received by a particular satellite 10. A frequency channel is assigned to user 15 and the caller's desired number is then routed through the system. Each LEO satellite is a distributed local processor. Satellite 10 switches the call to the appropriate cell contained either within its own cell compliment or to the appropriate satellite cell compliment. Satellite 10 will make a determination that the called user may be accessed through satellite gateway 1000. In that event, a path is established via a link from satellite 10 to satellite 1000 which, in turn, acts as a gateway switch and establishes a link to satellite 20. Satellite 20, in turn, establishes a connection to the called user. Thus, a system in accordance with the invention includes a plurality of LEO or first satellites and at least one satellite of a second type which is a gateway satellite to establish communication channels between the first satellites in the LEO constellation.

The two users 15 and 16 shown have hand-held SU's. The users may be in a boat on the water, in a moving vehicle, airborne, or part of a Public Switched Telephone Network ("PSTN") where the link is through a gateway. Each LEO satellite is a local processor. The system determines to which appropriate satellite or cell the call is to be switched. Each LEO satellite determines an optimal path from itself to the next appropriate satellite. These determinations may be made based upon the office code portion of the telephone number of the called user.

As shown in FIG. 1, it should also be noted that more than one gateway satellite may be provided in a global network. As shown in FIG. 1, a second gateway satellite 2000 is shown. In establishing connections between two users located at great distances apart, connections may be established between the gateway satellites. Thus, in that type of arrangement, should user 15 desire to talk to user 17, a path may be established from user 15 through LEO satellite 10 to gateway satellite 1000 which would have line-of-sight communication with gateway satellite 2000 and would establish a connection thereto. Gateway satellite 2000, in turn, would establish a path through LEO satellite 30 to user 17.

There may be multiple gateway satellites which communicate with each other or with the terrestrial gateways to determine the location of a called subscriber, but the call path would traverse through the LEO satellites only, with the gateway satellites providing the call processing control of the call (i.e. the call setup, tear-down, invocation of supplementary services, announcements, etc).

With only a relatively few number of gateway satellites placed in a HEO, worldwide switch network coverage can be provided with all of the switching occurring in space. Depending upon placement of the gateway satellites, three or four gateway switching satellites can cover substantially the entire world.

Figure 2:
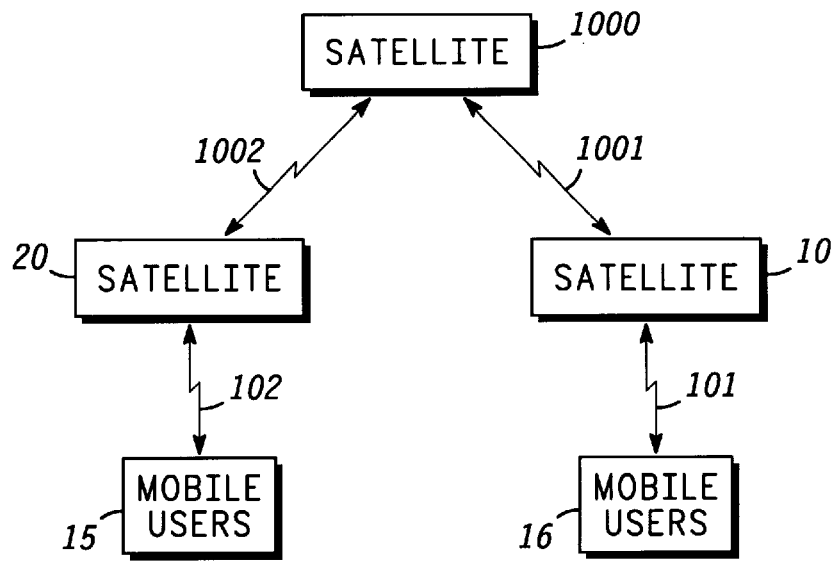
FIG. 2 shows a block diagram depicting the interconnection of satellite switching units with associated mobile users according to a preferred embodiment of the invention.

FIG. 2 depicts the interconnection of the satellites in providing a telephone connection described in conjunction with FIG. 1. Satellites 10 and 20 are each LEO satellites whereas in the illustrative embodiment satellite 1000 is a High Earth Orbiting ("HEO") satellite which may, in the preferred embodiment, be in a geosynchronous orbit. However, it should be understood that satellite 1000 may be a portion of a constellation of HEO satellites which either may be in geosynchronous orbit or not.

Mobile user 15 establishes link connection 101 to satellite 10. Satellite 10, in turn, utilizes the called number received from user 15 to make a determination that satellite gateway 1000 is to be utilized. A link 1001 is established between satellite 10 and satellite 1000. Satellite 1000, in turn, determines that the called party, i.e., user 16, may be serviced via satellite 20. Satellite 1000 establishes a link connection 1002 to satellite 20 which, in turn, establishes a link 102 to user 16. The intersatellite links, link 1001 and link 1002, may be implemented via data transmission on a microwave beam or a via a laser beam, for example.

Sometimes satellite gateway 1000 is used for call setup; meaning a voice communication link is established between satellites 10 and 20 without going through satellites gateway 1000. However, if the call path involved supplementary services such as multiparty calling for example, voice communication would be sent via satellite gateway 1000 since satellites 10 and 20 do not contain essential central office functions for multiparty calling that are contained in satellite gateway 1000.

Connection between the satellites and its mobile users is achieved via beams 101 and 102, for example. These beams are achieved via the satellite up-down link antennas which provide communication to users via the user's omnidirectional antenna.

Any of the LEO satellites such as satellite 20 is capable of transmitting and receiving data from a gateway. The gateway may be located in the satellite, such as satellite 1000 or it may be an earth-based gateway. The gateway link to earth-based gateways can be accomplished utilizing packetized data links similar to the satellite to satellite links.

Figure 3:
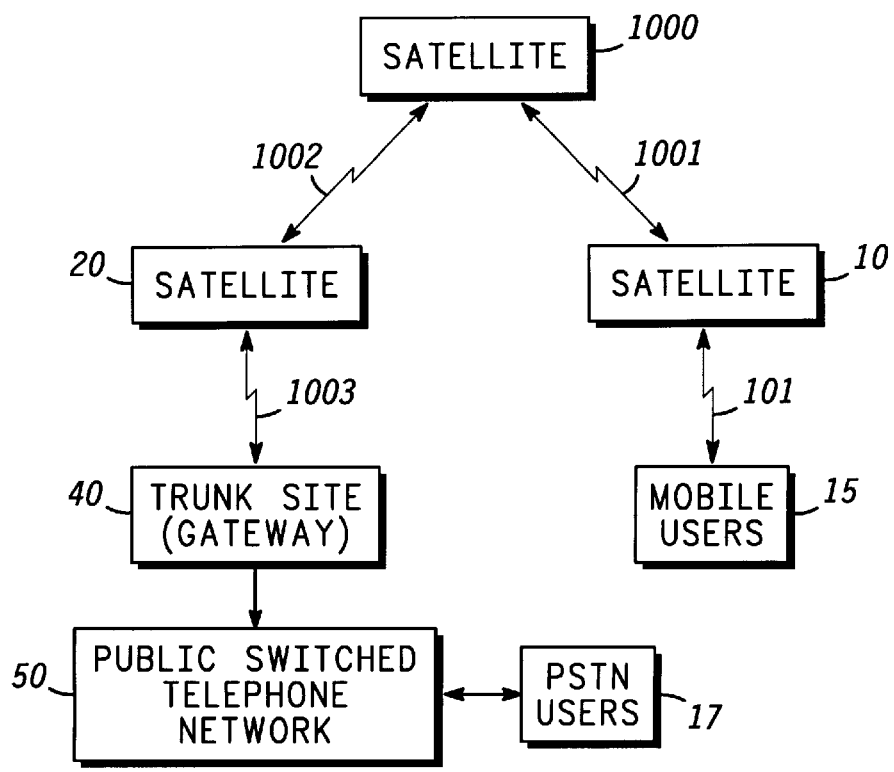
FIG. 3 shows a block diagram depicting the interconnection of satellite switching units with associated users and interconnection to the public switch telephone network according to a preferred embodiment of the invention.

Turning now to FIG. 3, a second illustrative interconnection between two users is shown. User 15 is, again, a user with a hand-held SU telephone and desires to establish a telephone connection to user 16 who, in this instance, does not have a hand-held SU telephone but has a conventional telephone connected into PSTN 50. In this instance, user 15 again goes off-hook in order to request service. This request for a channel is received again by satellite 10 via link 101. A frequency channel is assigned to user 15 and the called user's number is routed through the system. In this instance, satellite 10 determines that gateway satellite 1000 again must be utilized and establishes link connection 1001 to satellite 1000. Satellite 1000 performs the necessary gateway or switching functions, including registration and/or authentication, for example. Satellite 1000, in turn, establishes link 1002 to satellite 20. Satellite 20, in turn, establishes link connection 1003 to earth-bound gateway 40. Gateway 40, in turn, includes units which interconnect to PSTN 50. As a result of satellite 20 being connected through gateway 40 to PSTN 50, user 15 of the satellite cellular system which is connected directly via beam 101 to satellite 10 may transmit voice or data via the satellite structure (satellite-to-satellite via corresponding links) through gateway 40 and through PSTN 50 to selected user 17 of PSTN 50. Gateway satellite 1000 remains in the call control path to provide call setup, tear-down or supplementary services if required, but the user data (e.g., the voice path) is communicated between low-earth orbit satellites 10 and 20.

Satellite 1000 and gateway 40 are switching centers for the telecommunications network. Each switching center receives incoming signals from a plurality of origins and switches the incoming signals to a plurality of destinations. In the preferred embodiment, these signals may be digital packets which carry signalling or communication data. Signalling data represents messages that control operation of the switching services provided by the network. Communication data represents the payload information whose communication is the purpose for the network.

Each earth-bound gateway 40 includes an Earth Terminal Controller ("ETC") which directly communicates with the satellite and a Mobile Switching Center ("MSC") to couple to an ETC and to the PSTN via an interface. Satellite 1000 includes a MSC of the type used in the terrestrial-based Global System for Mobile Telecommunications. MSCs employ the intelligence needed to make connections between half-calls, where a half-call represents one end user or party to a connected call. Such connections are defined in a conventional manner. In addition, MSCs included in the gateway of satellite 1000 provide both basic and supplementary switching services again in a conventional manner.

FIGS. 4 through 7 illustrate the operational states of the communications network at various points in the dynamic intraswitching process. FIGS. 4 through 7 depict the process for establishing connection between telephone users 15 and 16 of FIG. 2 via LEO satellites 10 and 20 and gateway satellite 1000 which includes a MSC. Although the process is shown and described with respect to two hand-held telephone user units which are each served by a different satellite, the process applies throughout the telecommunications network to support all combinations of elements including, but not limited to, two hand-held SU users 15 and 16 each served by different LEO satellites 10, 20 and by the same satellite gateway 1000. The process for establishing switch connections between system users includes several steps which are performed by various ones of the user units which includes hand-held satellite telephones as well as conventional telephones, LEO satellites, satellite-based gateways, earth-based gateways all of which are discussed above in connection with the other figures. Hand-held user units, LEO satellites, and gateway satellites are each controlled by a computer and desirably include one or more processors, microprocessors, controllers and the like which execute programming instructions stored in memories thereof. Those skilled in the art will appreciate that the dynamic intraswitching process utilized may be implemented through such programming instructions in a manner well-known to those skilled in the art of computer-controlled equipment. Those skilled in the art will also understand that each of the user units, LEO satellites, and gateway satellites perform other steps which are not relevant to dynamic intraswitching. Such other steps may include query tasks and other programming mechanisms that evaluate various stimuli or otherwise determine whether to alter the program flow which is described herein.

Figure 7:
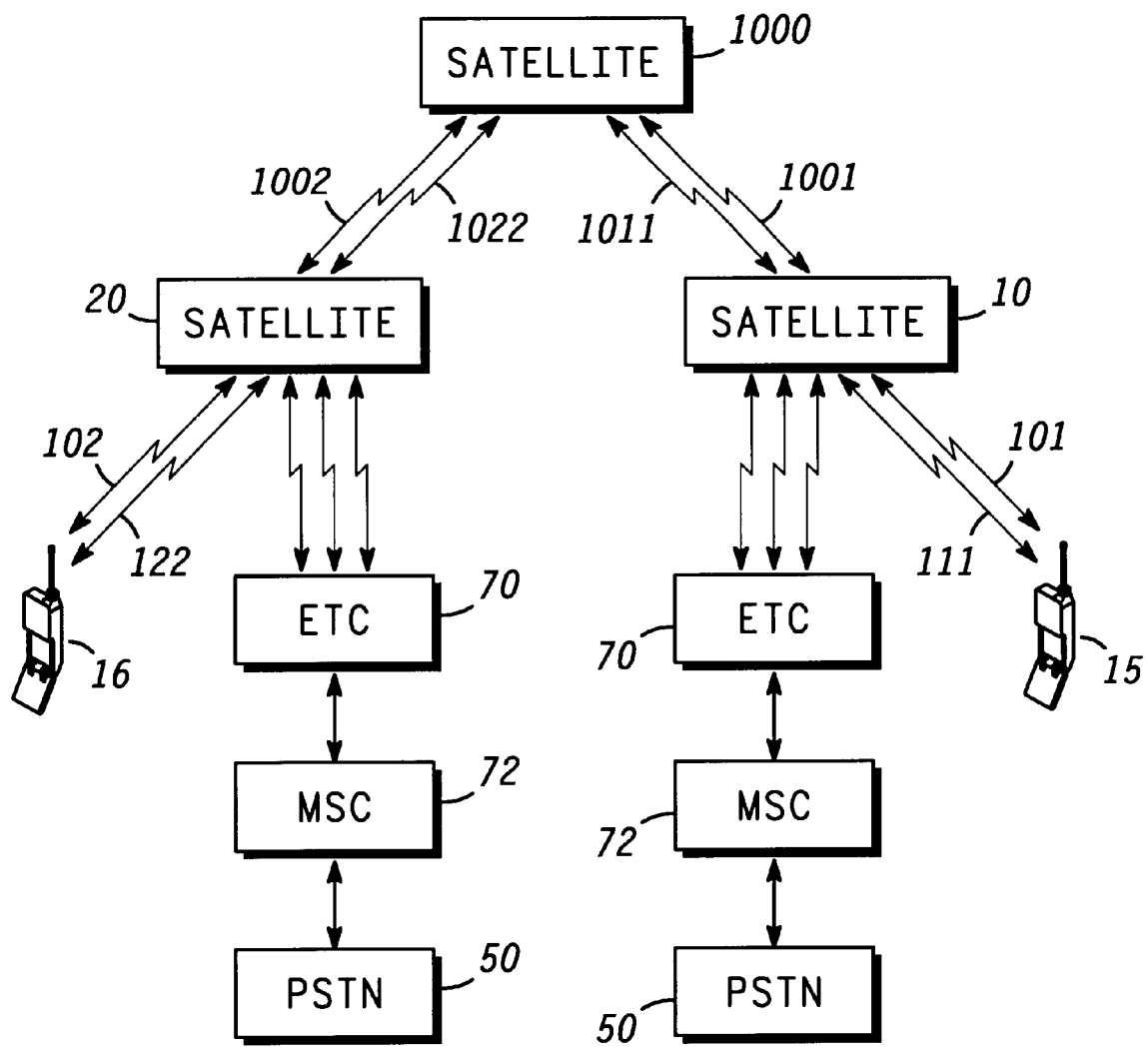
FIG. 7 shows the final operational state of the communication network in processing a call according to a preferred embodiment of the invention.
Figure 8:
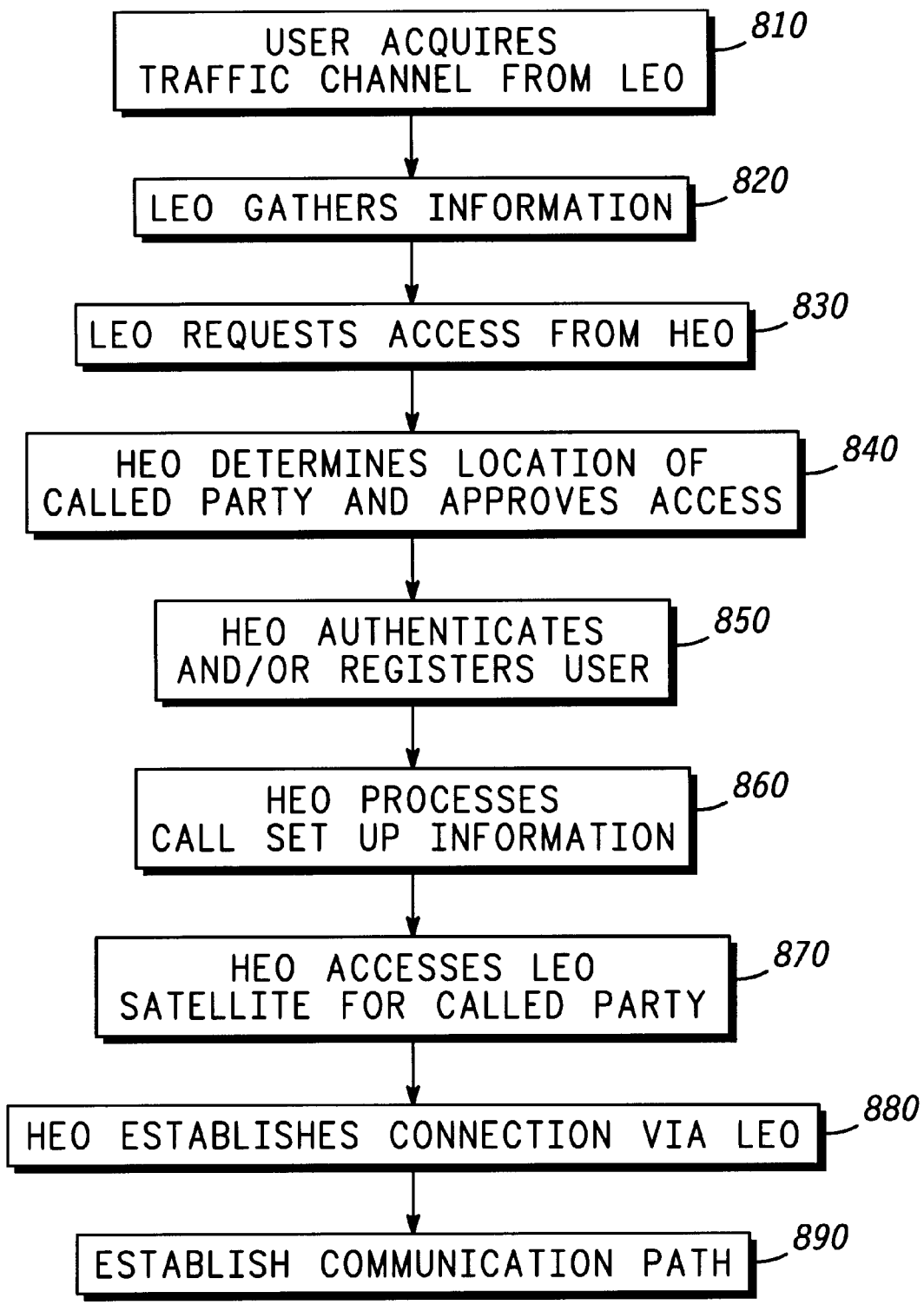
FIG. 8 shows a flowchart of a method performed according to a preferred embodiment of the invention.

FIG. 8 shows a flowchart of a method performed according to a preferred embodiment of the invention. FIG. 8 will be discussed i n conjunction with FIGS. 4–7. In FIG. 8, the process of establishing a connection between calling user 15 and called user 16 includes a step 810 wherein user 15 acquires a signalling channel 101 from LEO satellite 10. In step 820, initial stages of call setup occur in a conventional manner and involve the sending of various signalling messages over channel 101 between the user unit 15 and satellite 10. Satellite 10 gathers the various information from the signalling channel and from that information determines that access to gateway satellite 1000 is required. In step 830, satellite 10 requests access from gateway satellite 1000 via link 1001, as shown in FIG. 5. In step 840, gateway satellite 1000 determines the location of the called party to determine an appropriate LEO satellite 20 to be accessed, as shown in FIG. 5.

In step 850, gateway satellite 1000 authenticates and/or registers the user. If the user has been previously registered, gateway satellite 1000 authenticates that registration. If, however, the user has not previously been registered, then the registration information will be recorded.

Gateway satellite 1000 in step 860 provides call setup information to satellite 20 via link 1002 thereby accessing satellite 20 for the called party in step 870, as shown in FIG. 5. The gateway satellite 1000 then establishes a connection to the called user 16 in step 880 via satellite 20 and link 102, as shown in FIG. 5. The next system step 890 as shown in FIG. 8 is to establish a communication path. Establishment of the communication path is shown in FIGS. 6 and 7.

Turning now to FIG. 6, once a signalling path has been established between users 15 and 16, a communication path is established between user 15 and satellite 10 via link 111. A communication path is established from LEO satellite 10 to gateway satellite 1000 via link 1011.

Turning now to FIG. 7, the gateway satellite 1000 establishes a communication path to LEO satellite 20 via link 1022 and a communication path is established between satellite 20 and user 16 via link 122. A complete communication path is therefore established between user 15 and user 16 via LEO satellites 10, 20 and gateway satellite 1000. The communication path remains in space due to the intraswitching performed by satellites 10, 20 and gateway satellite 1000 and the intersatellite links. The vast majority of communication services provided by the satellite network are typically basic services. Thus, the intraswitching in satellites 10, 20, and 1000 vastly improve service quality for overall communication services. Moreover, conventional ETC 70 and MSC 72 can provide for connections via the PSTN 74 to users who do not have SU's. A distinct advantage of providing for the switching function in a satellite-based system is that the so-called "tail fees" which are charged when connecting through the PSTN 74 may be reduced by limiting connections through the PSTN 74 by appropriate selection of LEO satellites based on the location of the called user. A tail fee is a fee charged by an operation of the PSTN through which a call is connected. In the instances described with respect to FIG. 2 and FIGS. 4 through 7, the tail fee may be eliminated entirely where there is a connection between SU user 15 and SU user 16. In those instances, there is no need to utilize the PSTN.

The invention provides an improved communication network and method of operating that communication network. The communication network incorporates a space-based gateway switching center which works in conjunction with LEO satellites to provide reasonable service quality with both basic and supplementary communication services.

The invention has been described above with reference to preferred embodiments. However, those skilled in the art will recognize that changes and modifications may be made in these preferred embodiments without departing from the spirit or scope of the invention. For example, although satellites 10 and 20 have been described as being in low-earth orbit, satellites 10 and 20 may be in medium-earth orbit as well.

What is claimed is:

1. A satellite communication system for providing communication paths between a first user and a second user, the system comprising:

a plurality of low earth orbit satellites positioned in orbital planes, each of the plurality of low earth orbit satellites including a switching network, wherein the switching network in at least one of the plurality of low earth orbit satellites includes means for communicating with at least one terrestrial gateway, at least one space based gateway satellite, a plurality of users, and at least one other low earth orbit satellite;

at least one geosynchronous orbit gateway satellite positioned to communicate with the at least one of the plurality of low earth orbit satellites via communication links;

a first link coupling the first user to a first satellite of the plurality of low earth orbit satellites;

a second link coupling the second user to a second satellite of the plurality of low earth orbit satellites;

a third link coupling the first satellite to a geosynchronous orbit gateway satellite;

a fourth link coupling the second satellite to the geosynchronous orbit gateway satellite; and the geosynchronous orbit gateway satellite performing call setup and routing so that a communication path is established between the first and second users via the first, second, third, and fourth links.

2. A satellite communication system as recited in claim 1, wherein the geosynchronous orbit gateway satellite is positioned to communicate with another gateway satellite in another geosynchronous orbit.

3. A satellite communication system as recited in claim 1, wherein the geosynchronous orbit gateway satellite is positioned to communicate with another gateway satellite in high earth orbit.

4. A satellite communication system as recited in claim 1, wherein the geosynchronous orbit gateway satellite includes user authorization and registration apparatus.

5. A method of operating a space based communication network for establishing a communication path between a first user and a second user, comprising the steps of:

a) establishing a first signalling path between the first user and a first satellite, the first satellite comprising a switching system;

b) accessing a geosynchronous orbit gateway satellite via an intersatellite communication link between the first satellite and the geosynchronous orbit gateway satellite;

c) the geosynchronous orbit gateway satellite establishing a second intersatellite communication link between the geosynchronous orbit gateway satellite and a second satellite, the second satellite comprising a switching system;

d) the geosynchronous orbit gateway satellite establishing a second signalling path between the geosynchronous orbit gateway satellite and the second user, such that the first user is able to communicate signalling data with the second user; and e) the geosynchronous orbit gateway satellite performing call setup and routing so that the communication path is established between the first and second users for passing communication data, wherein the communication path includes a link between the first satellite and the second satellite, and does not include a link through the geosynchronous orbit gateway satellite.

6. A method as recited in claim 5, wherein step a) comprises the steps of:

a1) collecting destination information generated by the first user about the second user; and a2) collecting identifying information relating to the first user.

7. A method as recited in claim 6, comprising the step of using the identifying information in the geosynchronous orbit gateway satellite to authenticate and register the first user.

8. A method as recited in claim 7, comprising the step of using the identifying information in the geosynchronous orbit gateway satellite to authenticate the second user.

* * * * *